United States Patent [19]

Teraoka et al.

[11] 4,418,783
[45] Dec. 6, 1983

[54] TRACTOR

[75] Inventors: Akira Teraoka, Osaka; Tadashi Nakamura, Kawachinagano, both of Japan

[73] Assignee: Kubota, Ltd., Osaka, Japan

[21] Appl. No.: 370,068

[22] Filed: Apr. 20, 1982

[30] Foreign Application Priority Data

Sep. 2, 1981 [JP] Japan .............................. 56-130785[U]

[51] Int. Cl.³ .............................................. B60K 17/00
[52] U.S. Cl. ....................................... 180/209; 180/75; 180/252; 180/DIG. 2
[58] Field of Search ................. 180/209, 252, 255, 75, 180/DIG. 2; 280/43; 301/127, 128, 124 R, 124 H

[56] References Cited

U.S. PATENT DOCUMENTS

| 1,405,642 | 2/1922 | Vanderbeck | 180/75 |
| 1,793,482 | 2/1931 | Hendrickson | 180/900 |
| 2,603,302 | 7/1952 | Anderson | 180/75 |
| 2,722,988 | 11/1955 | Kuhary et al. | 180/75 |
| 3,822,757 | 7/1974 | Spence | 180/255 |
| 4,003,444 | 1/1977 | Nobutomo et al. | 180/75 |

Primary Examiner—Joseph F. Peters, Jr.
Assistant Examiner—Donn McGiehan
Attorney, Agent, or Firm—Cushman, Darby & Cushman

[57] ABSTRACT

A tractor in which a function of adjusting the rut distance and the vehicle body height from the ground is combined, in a simple and effective manner, with the front wheel drive and steering mechanisms and the rear wheel drive mechanisms.

3 Claims, 8 Drawing Figures

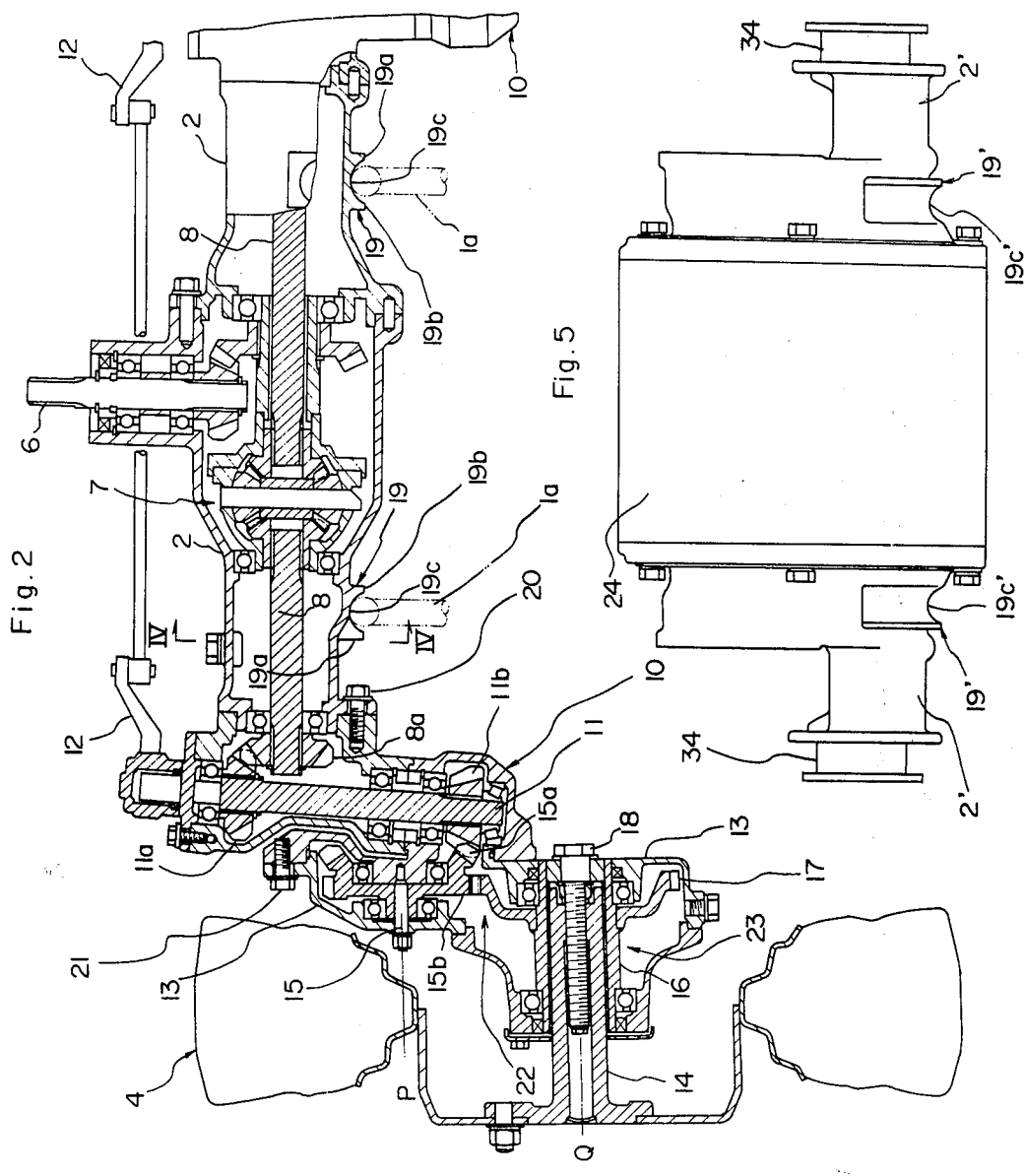

TRACTOR

BACKGROUND OF THE INVENTION (1) Field of the Invention

The present invention relates to a tractor having improvements in the wheel supporting mechanisms, the wheel drive mechanisms and the axle case mechanisms so as to permit the vehicle body height from the ground and the rut distance to be adjusted.

(2) Description of the Prior Art

In order to apply a tractor to various kinds of works, the tractor should be constructed such that its body height from the ground and rut distance can be adjusted.

Generally, the vehicle body height from the ground may be adjusted by changing the wheels to other wheels having different diameters or by arranging such that the wheels may be attached selectively at different positions of the vehicle body.

The rut distance may be adjusted by expanding and contracting the wheel axles.

If such mechanisms for adjusting the vehicle body height from the ground and the rut distance are disposed at the sides of the wheels to be driven, the whole structure becomes extremely complicated.

Besides, if a steering function is added to such mechanisms, the whole structure becomes further complicated.

In order to perform such adjustments of the vehicle body height from the ground and the rut distance, provision should be made to lift up the vehicle body in a stable manner.

SUMMARY OF THE INVENTION

It is an object of the present invention to provide a tractor in which, with the vehicle body lifted up in a stable manner, the vehicle body height from the ground and the rut distance can be adjusted in a simple structure.

A tractor in accordance with the present invention comprises: a front axle case incorporating a differential gear and front wheel driving shafts; steering cases incorporating transmission shafts for transmitting power from the front wheel driving shafts, said steering cases removably connected to the front wheel axle case; front wheel housings incorporating gear transmission mechanisms interlockingly connected to the transmission shafts, said housings connected to the steering cases such that the mounting positions of said housings can be changed around the gear rotating centers of the gear transmission mechanisms; front axles adapted to receive power from the gear transmission mechanisms and attached to the front wheel housings such that the front axles can move in the axial directions thereof and their relative positions with respect to the front housings can be fixed; front wheels fixed to the front axles; rear axle cases incorporating rear wheel driving shafts; rear wheel housings incorporating gear transmission mechanisms interlockingly connected to the rear wheel driving shafts, said housings connected to the rear axle cases such that the mounting positions of the housings can be changed around the gear rotating centers of the gear transmission mechanisms; rear axles adapted to receive power from the gear transmission mechanisms for rear wheels, said axles attached to the rear wheel housings such that the axles can move in the axial directions thereof and their relative positions with respect to the rear wheel housings can be fixed; and rear wheels fixed to the rear wheel axles; the front axle case and the rear axle cases being provided at the lower sides thereof with semi-circular projections separated from each other in the axial directions of the cases.

According to the present invention, the housings incorporating the gear transmission mechanisms for front and rear wheels are mounted to the respective front and rear axle cases such that their mounting positions are adjustable, thus enabling the front and rear wheels mounted to the housings to be vertically changed in position. Namely, a simple structure with the effective use of the gear rotating centers of the gear transmission mechanisms enables the vehicle body height from the ground to be adjusted.

Moreover, according to the present invention, the front and rear axles are movable in their axial direction and their relative positions with respect to the front and rear wheel housings may be fixed, thus enabling the rut distance to be adjusted. This facilitates such adjusting operation. That is, adjustment of the rut distance can be externally performed more easily, as compared with a conventional method according to which the transmission shafts in the front and rear axle cases are arranged to be contractile.

Furthermore, according to the present invention, there is provided an advantage as to the vehicle body lifting-up operation to be made in performing the wheel replacement or adjustments above-mentioned. Namely, contact of a stand means with the semi-circular projections mentioned earlier enables the vehicle body to be supportingly lifted up in a stable manner without any positional shift in the transverse direction of the vehicle body.

Other objects and advantages of the present invention will be apparent from the following description.

BRIEF DESCRIPTION OF THE DRAWINGS

The present invention will be further described, by way of example, with reference to the attached drawings, in which:

FIG. 2 is a vertical section view of a front wheel mounting portion;

FIG. 5 is a side view illustrating rear axle cases;

DESCRIPTION OF THE PREFERRED EMBODIMENT

Figure 1:
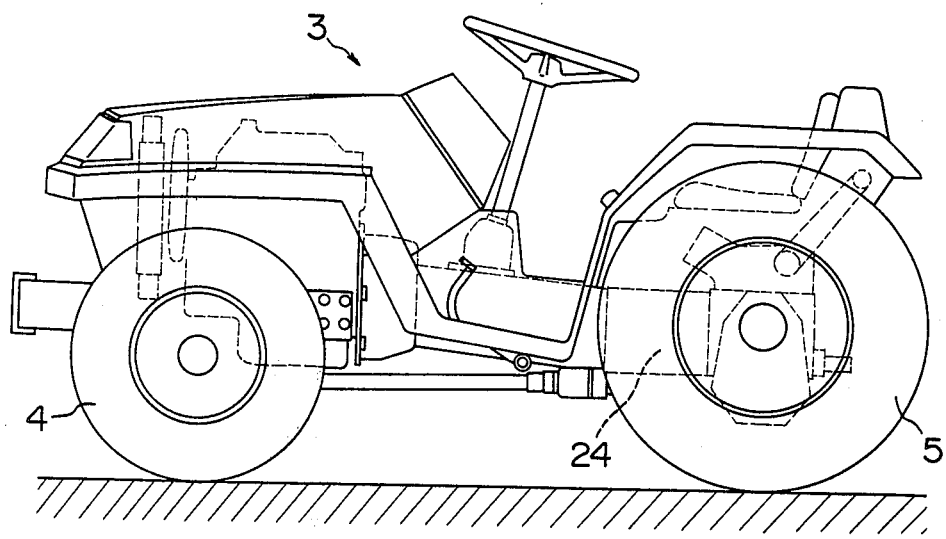
FIG. 1 is a general side view of a tractor in accordance with the present invention.

FIG. 1 is a general side view of a tractor 3 of which both front wheels 4 and rear wheels 5 are to be driven.

FIG. 2 illustrates a drive and steering mechanism for one of the front wheels 4, in which power is transmitted, by a drive shaft 6, to a differential gear 7 which transmits the power to wheel driving shafts 8 having bevel gears 8a.

An axle case 2 has a construction to be divided into two portions in its axial direction with the differential gear 7 being as a center. Steering cases 10 are secured to the axle case 2 with bolts.

Transmission shafts 11 each having bevel gears 11a and 11b are journalled to the steering cases 10 so as to receive power from the bevel gears 8a of the axle driving shafts 8, through their bevel gears 11b.

Knuckle arms are generally designated by 12. The front wheels 4 may be steered by swinging these arms 12.

Housings 13 for axles 14 are connected to the steering cases 10 in a manner rotatable around the axes of the transmission shafts 11. One ends of the knuckle arms 12 are connected to the steering cases 10.

Transmission shafts 15 are journalled to the housings 13 at the upper portions thereof, and spur gears 15b integral with bevel gears 15a are put on the transmission shafts 15 with gaps provided therebetween. The bevel gears 15a mesh with the bevel gears 11b in the steering cases 10. The spur gears 15b are meshed with gears 17 fixed to axle sleeves 16 journalled to the housings 13 and splined and fitted to axles 14.

Figure 3:
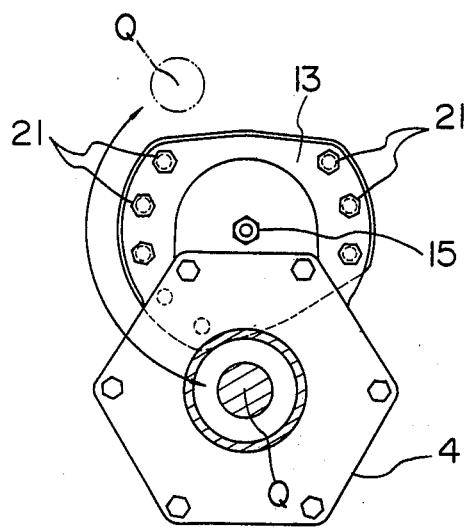
FIG. 3 is a view illustrating the operation of main portions in FIG. 2.

As shown in FIG. 3, a plurality of bolts 21 are used for securing the housings 13 to the steering cases 10.

With the bolts 21 removed, the housings 13 may be rotated by a predetermined angle around the axes P and then fixed to the steering cases 10. Thus, the position of the axes Q of the axles 14 may be changed to the position shown by the imaginary line in FIG. 3, so that the vehicle body height from the ground may be changed.

As shown in FIG. 2, rut distance adjusting bolts 18 are mounted to the housings 13 so as to be threadedly connected to screw holes formed in the axes of the axles 14. The rotation of the bolts 18 causes the axles 14 to axially move, since the axles 14 are splined and fitted into the sleeves 16. Thus, wheel mounting position changing mechanisms 23 are formed.

Figure 4:
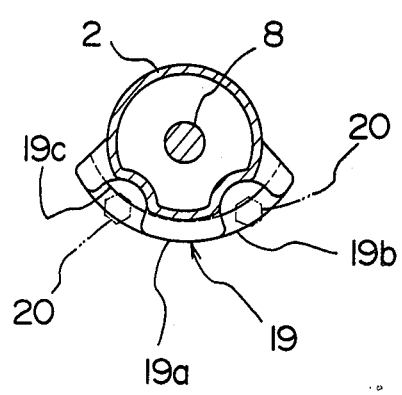
FIG. 4 is a section view taken along the line IV—IV in FIG. 2.

Projections 19 constructed integrally with the axle case 2 project from the lower surface thereof. Each of these projections having an outer projecting portion 19a and an inner projecting portion 19b, is adapted to prevent each arm 1a of a lifting means 1 from moving in the axial direction of the axle case 2. Receiving portions 19c are formed in a semi-circular shape so as to receive the arms 1a. As shown in FIGS. 2 and 4, the inner projecting portions 19b are formed in a semi-circular shape, while the outer projecting portions 19a have notches so as to facilitate the attachment and removal of bolts 20 for mounting the axle case 2 to the steering cases 10.

FIG. 5 illustrates rear axle cases 2' for supporting the shafts of the rear wheels 5. Each of the axle cases 2' is provided at the lower side thereof with a projection 19', similar to the projections 19, having a receiving portion 19'c for receiving the arm 1a. It is to be noted that the distance between the left and right projections 19 of the front axle case 2 is substantially same as the distance between the left and right projections 19' of the rear axle cases 2', so that one lifting means 1 can be used both for the front and rear projections 19 and 19'.

Figure 6:
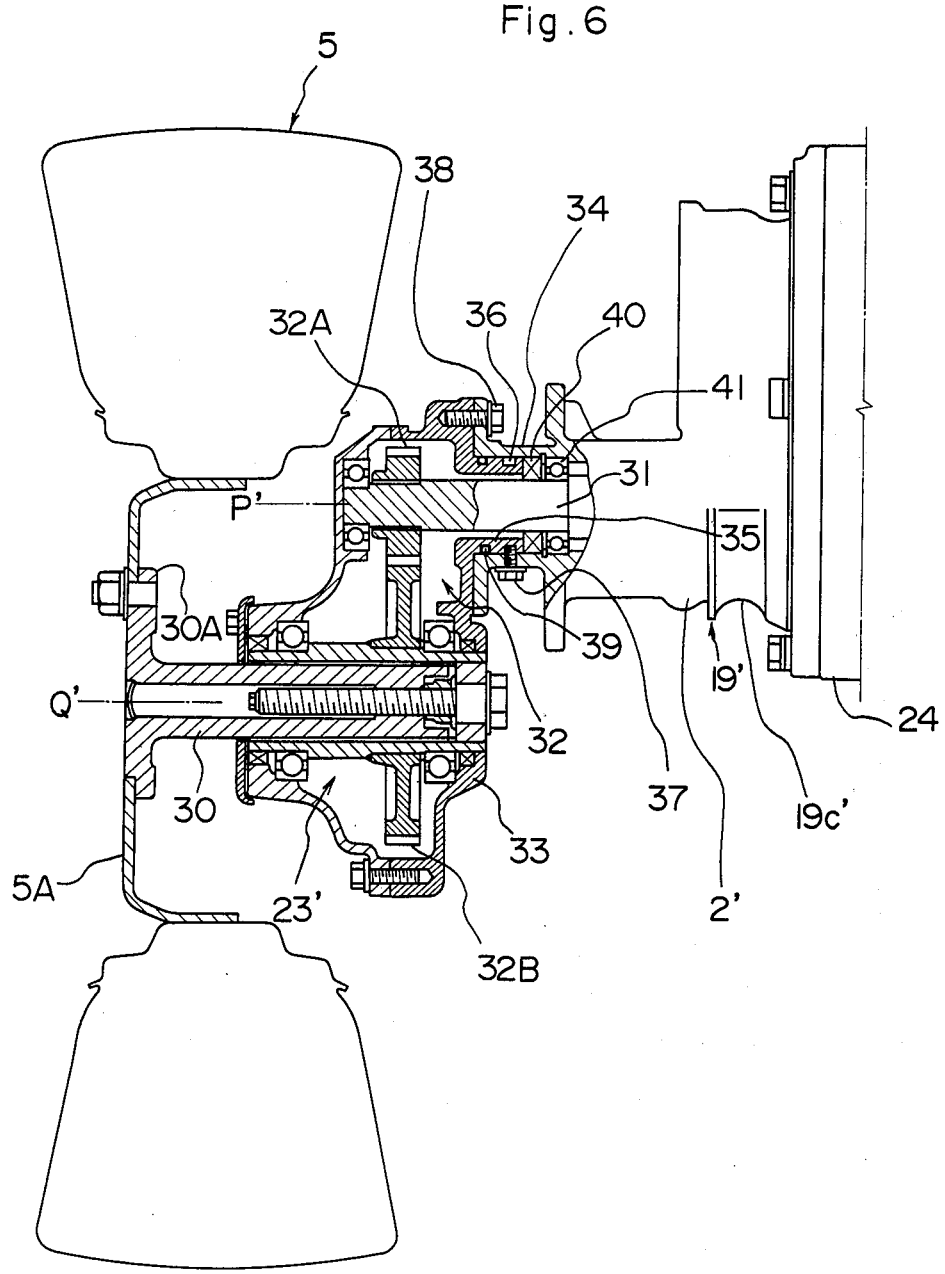
FIG. 6 is a vertical section view of a rear wheel mounting portion.

FIG. 6 illustrates a drive unit for the rear wheels 5 to be driven, which is constructed as follows.

Each of axle housings 33 supports a cylindrical axle 30 having a coupling flange 30A disposed for a disk 5A of the rear wheel 5, and incorporates a gear transmission mechanisms 32 having a pair of final gears 32A and 32B for interlocking the cylindrical axle 30 with a rear wheel drive shaft 31 which transversely projects from a transmission case 24. The axle housings 33 are attached to the external lateral sides of the transmission case 24, in a manner rotatable around the axes of the rear wheel drive shafts 31.

Cylindrical members 34 and 35 are disposed around the outer periphery of each rear wheel drive shaft 31 both at the sides of the transmission case 24 and the axle housing 33, these cylindrical members 34 and 35 being fitted into each other by a suitable length in the axial direction of each rear wheel drive shaft 31. The cylindrical members 35 located at the inner side or the axle housing 33 side are provided in the outer peripheries thereof with annular grooves 36 in the peripheral direction. The cylindrical members 34 located at the outer side or the transmission case 24 side have bolts 37 which are threadedly connected to the cylindrical members 34 and are fittingly engaged with the peripheral grooves 36, thereby to prevent the members 35 from coming out from the members 34.

Bolts 38 are threadedly connected to the flanges of the outer cylindrical members 34 and those portions of the axle housings 33 which correspond to these flanges. These bolts 38 are disposed for fixing the axle housings 33 selectively at different positions around the axes P' of the rear wheel drive shafts 31.

O-rings 39 are disposed between the outer peripheries of the inner cylindrical members 35 and the inner peripheries of the outer cylindrical members 34. Oil seals 40 and bearings 41 are disposed between the inner peripheries of the outer cylindrical members 34 and the outer peripheries of the rear wheel drive shafts 31.

Between the final gears 32B at the driven side and the cylindrical axles 30, there are disposed mechanisms 23' for changing the wheel mounting position in the axial direction Q' of the cylindrical axles 30. The detailed description of these wheel mounting position changing mechanisms 23' is here omitted since their structure is the same as that of the front wheel mounting position changing mechanisms 23 discussed earlier.

According to the embodiment of the present invention discussed hereinbefore, the wheels can be lifted up in a stable manner, and the axle cases having strength sufficient to support the lifting means can be provided.

Generally speaking, the wheels are lifted up in replacing the wheels with other wheels having different diameters, or changing the wheel mounting position or the rut distance. For lifting up the wheels, a jack is generally used.

Figure 8:
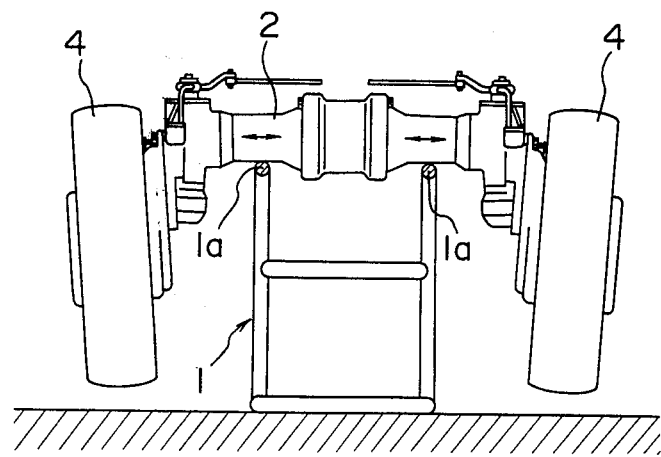
FIG. 8 is a front view illustrating how the wheel lifting means is used.
Figure 7:
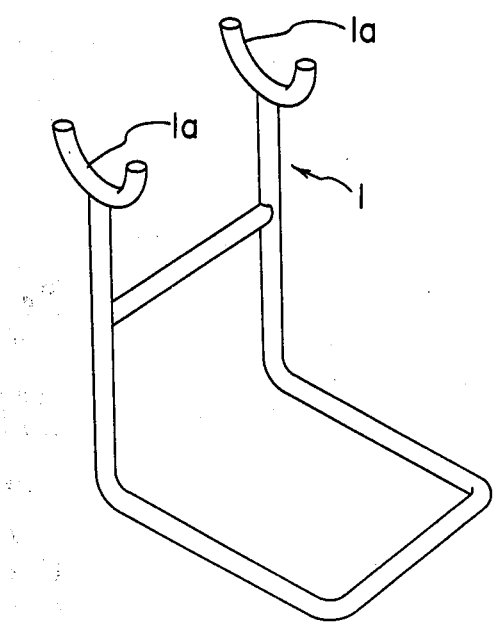
FIG. 7 is a perspective view of a wheel lifting means.

Alternatively, there may be proposed a method according to which the wheel lifting means 1 shown in FIG. 7 is made in contact with the axle case 2 and the wheels are then lifted up with the effective use of a tractor front or rear wheel driving force, as shown in FIG. 8. However, when the arms 1a of the lifting means 1 are made in contact with the lower side of, for example, the axle case 2 and the front wheels are then brought into a lifting posture while the front or rear wheels being driven as shown in FIG. 8, there is the risk of the arms 1a moving in the axial direction (as shown by the arrows in FIG. 8) of the axle case 2, thereby to lose the balance of the vehicle body.

In view of the foregoing, according to the present invention, the axle cases are provided with the projections 19 and 19', enabling to prevent the lifting means from moving in the axial direction of the axle cases. Thus, the wheels can be lifted up in a stable manner.

It is to be noted that the projections 19 and 19' also serve as reinforcing members for the axle cases themselves.

What we claim:

1. A tractor comprising:

a front axle case (2) incorporating a differential gear (7) and front wheel driving shafts (8);

steering cases (10) incorporating transmission shafts (11) for transmitting power from said front wheel driving shafts (8), said steering cases (10) removably connected to said front axle case (2);

front wheel housings (13) incorporating gear transmission mechanisms (22) interlockingly connected to said transmission shafts (11), said housings (13) connected to said steering cases (10) such that the mounting positions of said housings (13) can be changed around the gear rotating centers (P) of said gear transmission mechanisms (22);

front axles (14) adapted to receive power from said gear transmission mechanisms (22) and attached to said front wheel housings (13) such that said axles (14) can move in the axial directions (Q) thereof and their relative positions with respect to said housings (13) can be fixed;

front wheels (4) fixed to said front axles (14);

rear axle cases (2') incorporating rear wheel driving shafts (31);

rear wheel housings (33) incorporating gear transmission mechanisms (32) interlockingly connected to said rear wheel driving shafts (31), said housings (33) connected to said rear axle cases (2') such that the mounting positions of said housings (33) can be changed around the gear rotating centers (P') of said gear transmission mechanisms (32);

rear axles (30) adapted to receive power from said gear transmission mechanisms, said rear axles (30) attached to said housings (33) such that said rear axles (30) can move in the axial directions (Q') thereof and their relative positions with respect to said housings (33) can be fixed; and rear wheels (5) fixed to said rear axles (30);

said front axle case (2) and said rear axle cases (2') provided at the lower sides thereof with semi-circular projections (19, 19') separated from each other in the axial direction of said cases (2, 2').

2. The tractor as set forth in claim 1, wherein each of the projections (19, 19') has an outer projecting portion (19a, 19'a) and an inner projecting portion (19b, 19'b), said outer projecting portions (19a, 19'a) having notches.

3. The tractor as set forth in claim 2, wherein said projections (19, 19') have semi-circular receiving portions (19c, 19'c).

* * * * *